United States Patent [19]

Oliver et al.

[11] 3,931,615
[45] Jan. 6, 1976

[54] CONTROLLER FOR DIGITAL DEVICES

[75] Inventors: Glenn A. Oliver, Campbell; Kenneth D. Krossa; Douglas B. Earl, both of Los Altos, all of Calif.

[73] Assignee: Scientific Micro Systems, Mountain View, Calif.

[22] Filed: July 22, 1974

[21] Appl. No.: 490,854

[52] U.S. Cl. ............................................ 340/172.5
[51] Int. Cl.[2] ........................................ G06F 7/38
[58] Field of Search ...................... 340/172.5; 445/1

[56] References Cited
UNITED STATES PATENTS
3,453,600   7/1969   Stafford et al. .................. 340/172.5

OTHER PUBLICATIONS

*Processor Handbook*, PDP 11/05,10,35,40 Digital Equip. Corp., 1973, pp. 2-1 to 2-12.
*Model 960A Computer System Characteristics*, Texas Inst., 1974, pp. 2,3,7,10-16.
Bloch, E., *The Engineering Design of the Stretch Computer*, In 1959 Proc. E.J.C.C., 1959, pp. 48-58.

*Primary Examiner*—R. Stephen Dildine, Jr.
*Attorney, Agent, or Firm*—Flehr, Hohbach, Test, Albritton & Herbert

[57] ABSTRACT

Disclosed is a controller which functions to interconnect and control one or more digital devices such as magnetic discs, typewriters and other digital data processing equipment. The controller receives input signals and delivers output signals through interface vector (IV) buffer stores which connect to and from user devices. The logical state of the output signals in the buffer stores is determined by an instruction-controlled processor which accesses instructions from a memory. The instructions are processed in response to input signals (operands) from buffer stores and produce output signals (operands) to the buffer stores. The instruction fetching paths and the operand fetching and storing paths are separate. The controller includes apparatus and an instruction set which allows variable fields in the buffer stores to be addressed to provide source operands and to be addressed to store result operands after instruction execution.

27 Claims, 6 Drawing Figures

CONTROLLER FOR DIGITAL DEVICES

BACKGROUND OF THE INVENTION

The present invention relates to controllers for controlling digital devices and particularly to controllers employed in data processing systems of all sizes.

Controllers are typically connected over an input/output interface to one or more controlled devices. The controllers function to produce a particular set of output signals which is a function, in part, of the particular set of input signals received. In general, it is desirable for the controllers to produce the output signals in as short a time as possible. The number and logical state of input and output signals and the sequence in which they occur varies widely among different controlled devices.

Frequently the control functions necessary to control digital devices have been embodied in dedicated controllers which perform dedicated logic functions. For example in a magnetic disc system, a disc drive is controlled by a magnetic disc controller. The disc controller controls the disc drive and integrates the disc drive into a larger processing system. Controllers of the dedicated type suffer from an inflexibility which results because they are designed for use with a single type of digital device and hence, they are not readily adapted for use with other devices.

In order to obtain greater flexibility in implementing control functions, programmable small processors (frequently called microprocessor) can be employed as controllers for digital devices. Although programmable processors have greater flexibility, they are generally inefficient when used to perform control functions. The inefficiency arises, in part, because processors are generally organized to optimize execution time with apparatus in which instructions and operands are addressed and accessed from common memory with common circuitry. For these and other reasons, programmable processors have not allowed the full potential of processors to be directed to performing control functions.

In accordance with the above background, an object of the present invention is to provide an improved method and apparatus for controlling digital devices utilizing the flexibility of stored programs of instruction in an apparatus particularly suitable for performing control functions.

SUMMARY OF THE INVENTION

The present invention is a controller for controlling digital devices of the type utilized in data processing systems. The controller stores input and output signals (operands) in interface vector(IV) buffer stores. The IV buffer stores are accessable for reading and writing by the controlled digital devices. The buffer stores are also accessable for reading and writing by a programmed interpreter within the controller. The programmed interpreter functions to execute instructions stored in a memory and in so doing dynamically controls the digital devices. The interpreter includes apparatus and an instruction set in which the IV buffer stores are specified as the source of and/or the destination of variable length operands utilized in the execution of instructions. Instruction accessing and operand accessing are carried out with separate apparatus.

In accordance with one embodiment of the present invention, each of the IV buffer stores includes a plurality of data latches. The latches are connected in common, to a digital device bus (UD bus) and to an interpreter bus (IV bus). The latches are available for reading or writing by way of either the UD bus or the IV bus. In one embodiment, a write operation from a digital device on the UD bus is given priority over a write operation from the interpreter on the IV bus. Read operations are non-destructive and non-interfering. Each buffer store is also assigned an address within the address space of the instructions processed by the interpreter. Each buffer store is connected in common with the IV bus. An address detector in each buffer store functions to detect when its preassigned address appears on the IV bus and hence has been addressed by the interpreter. When a buffer store is addressed, the address detector detects the address on the IV bus and responsively sets an enable latch which enables the data latches for reading and writing by the interpreter over the IV bus. Reading and writing over the UD bus by a digital device is always permitted independently of the setting of the enable latch. Whenever an address detector in a buffer store detects that the IV bus address is not the one assigned to the buffer store, the address detector causes the enable latch to be disabled thereby inhibiting communications between the interpreter and the data latches of that buffer store.

In accordance with a further embodiment of the present invention, a first plurality of IV buffer stores are organized into a first bank (left bank) and a second plurality of buffer stores are organized into a second bank (right bank). The IV buffer stores in one bank are addressed in common under control of the interpreter and the IV buffer stores in the other bank are addressed in common by the interpreter. The apparatus is capable of operating such that a buffer store in one bank serves as an operand source while a buffer store in the other bank serves as an operand destination during execution of one instruction. A feature of the invention includes a paged working store connected for addressing to the IV bus through IV buffer stores.

In accordance with a further embodiment of the present invention, the memory which stores instructions is a read-only memory (ROM).

In accordance with further details of the present invention, the interpreter includes an instruction register which receives an instruction from the read-only memory once each cycle. Each instruction in the instruction register is decoded by a control unit which provides control signals for instruction execution. The interpreter includes an arithmetic and logic unit for performing ADD, AND and EXCLUSIVE-OR functions. The interpreter includes a register array having a plurality of addressable registers which connect, through an input field control circuit, to one port of the arithmetic and logic unit. An addressable accumulator register connects to the other port of the arithmetic and logic unit. Each buffer store is also an addressable location for providing operands to the interpreter through the input field control circuit. The input field control circuit rotates and selects source operand fields as inputs to the arithmetic and logic unit. The outputs from the arithmetic and logic unit are connected to the register array, to the accumulator and through an output field control circuit to the buffer stores.

The interpreter also includes instruction address formation apparatus which includes an address register and a program counter. The program counter is incremented to sequentially step through addresses in the ROM memory. Instructions and apparatus are provided to jump the address in the address register to a new predetermined address or to concatenate the address in the program counter to form a new address.

In accordance with the above summary, the present invention achieves the objective of providing an improved method and apparatus for controlling digital devices using a variable number of input and output control points, as implemented by addressable variable field buffer stores which are controlled by a stored program of instructions.

The foregoing and other objects, features and advantages of the invention will be apparent from the following more particular description of preferred embodiments of the invention, as illustrated in the accompanying drawings.

DETAILED DESCRIPTION

Figure 1:
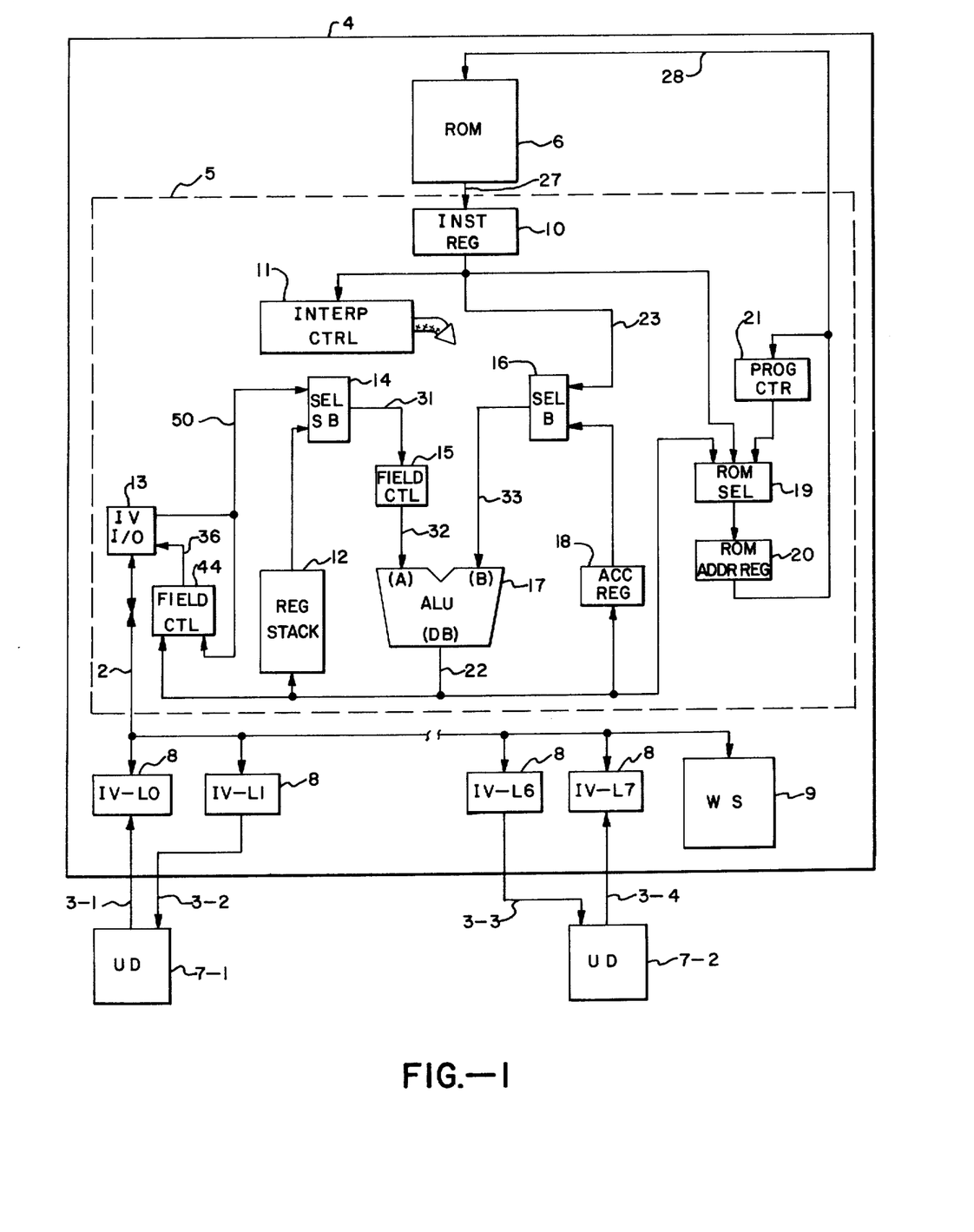
FIG. 1 depicts an overall block diagram of a controller in accordance with the present invention interconnected to digital user devices.

General System — FIG. 1

In FIG. 1, the controller 4 connects to digital user devices 7-1 and 7-2 over user device(UD) data buses (user buses 3-1 through 3-4. The user buses 3-1 through 3-4 connect to the interface vector(IV) buffer stores 8-1 through 8-4, respectively. The IV buffer stores 8 define control points for the user devices 7. The buffer stores 8 both receive and output signals from and to the user devices. The logical state of the control points defined by the signals from and to the buffer stores is a function of a stored program of instructions in the controller 4. The program is stored in the memory 6 which, for economy, is preferably a read-only memory(ROM). Instructions from memory 6 together with information received from user devices in the buffer stores 8 are processed in the interpreter 5.

The interpreter 5 includes an instruction register (INST REG) 10 which receives the latest instruction from the read-only memory 6. Each instruction stored in register 10 is accessed from the memory 6 at the address specified by the ROM address register (ROM ADDR REG) 20.

Figure 4:
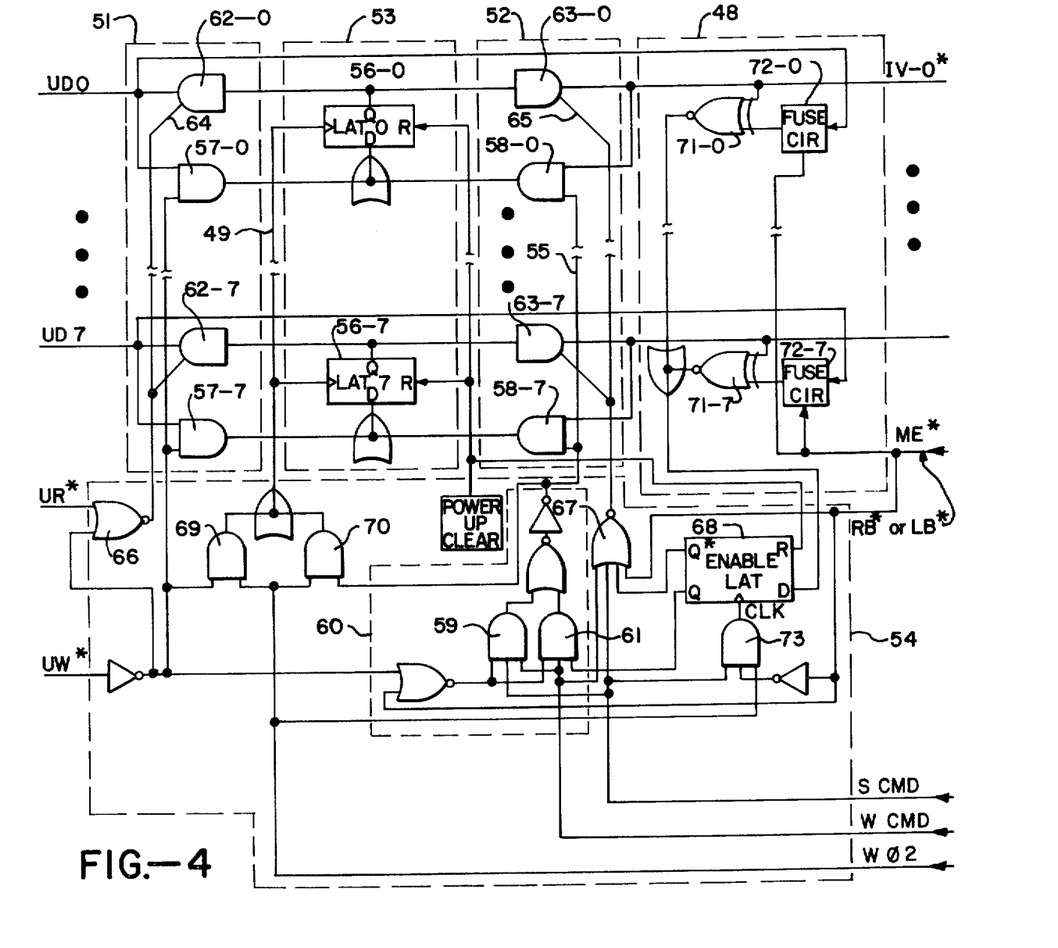
FIG. 4 depicts a further detailed representation of the FIG. 3 buffer store.

Each instruction in register 10 is decoded in interpreter control(INTERP CTRL) 11 to control many operations of the FIG. 4 apparatus. The interpreter 5 includes an arithmetic and logic unit (ALU) 17. The arithmetic and logic unit 17 receives an input field to one port from the A bus 32 and a second input field to the other port from the B bus 33 and develops an output on the destination bus (DB) 22. The destination bus 22 connects as an input to a working register stack 12, to an accumulator register(ACC REG) 18, to the ROM select (ROM SEL) circuitry 19, and to the IV input/output (IV I/O) circuitry 13. The accumulator register 18 in turn connects through selection circuit(-SEL B) 16 to form one possible input to the B bus 33 of ALU unit 17. Another input to selection circuit 16 is derived directly from the instruction register 10 on bus 23.

The output from the register stack 12 connects to selection(SEL SB) circuit 14 to provide one source for the source bus(SB) 31 which feeds the fetch field control (FIELD CTL) circuit 15. The other input to the selection circuit 14 is from the IV input/output(IV I/O) circuit 13 which connects to the directional IV bus 2. The source bus 31, output from the selection circuit 14, connects through the field control circuit 15 to the A bus 32 input to the arithmetic and logic unit 17.

The output from arithmetic and logic unit 17 connects as an input to accumulator register 18, register stack 12 and to output field control circuit 44. Circuit 44 functions to select and shift output fields from destination bus(DB) 22 and bus 50 for output on IV bus 2 through IV I/O circuit 13.

The destination bus 22 from unit 17 also connects as an input to the ROM selection(ROM SEL) circuitry 19. Selection circuitry 19 also receives an input from the instruction register 10 and from the program counter(PROG CTR) 21. The selection circuitry 19 selects fields from one or more of the three inputs to form an address in ROM address register (ROM ADDR REG) 20. The address in the address register 20 is input by bus 28 to address the read-only memory 6. The output from the address register 20 also connects as an input to the program counter 21. Program counter 21 usually increments by one the address in the address register 20 each time the read-only memory 6 is addressed. At certain times the program counter does not increment or performs some other function.

The operation of the FIG. 1 apparatus is briefly as follows. The read-only memory 6 presents the interpreter 5 with a new addressed instruction each instruction cycle. The instruction presented in the one located at the ROM address specified in the address register 20. The addressed instruction is stored for decoding in the instruction register 10. Each instruction typically specifies both a source operand and a destination for the result operand. The source and destination operands may be from or to an addressed one of the IV buffer stores 8, an addressed one of the registers in the register stack 12, the accumulator 18, or the ROM address register 20. The source operand is presented on the A bus input to the arithmetic and logic unit 17 and the destination operand appears output on the destination bus(DB) 22. A jump instruction causes one operand to go directly to the address register 20. A second source operand is derived implicitly through the selection circuit 16 (from the accumulator register 18 or instruction register 10) without explicit identification in the instruction stored in register 10. The program counter 21 forms the address of a new instruction using the current instruction alone or in combination with the data from the destination bus 22 or the instruction register 10.

The operation of the FIG. 1 apparatus allows any field length operand from any particular one of the buffer stores 8 to be specified as the source or the destination in executiing the instruction stored in register 10. In this manner, the controller 4 communicates with each user device 7 with a highly selectable number of control points either for inputting or outputting information to or from the user devices.

In FIG. 1, the accessing (fetching and storing) of operands and the accessing (fetching) of instructions are carried out by independent apparatus. On one hand, the instruction address fromation apparatus including program counter 21, selection circuit 19 and address register 20 is connected to the memory 6 over an instruction address bus 28. Bus 28 does not carry the addresses of operands and the memory 6 does not store operands. Instructions are transmitted from the memory 6 to the interpreter 5 over the instruction bus 27. Bus 27 also does not transmit operands. On the other hand, operands are transmitted to and from the user devices 7 through the IV buffer stores 8 to the common IV bus 2. The bus 2 connects operands between addressed ones of the buffer stores and the interpreter 5 independently from instruction accessing. Because of this independence of the instruction accessing and the operand accessing, the present invention provides for high-speed operation.

Figure 2:
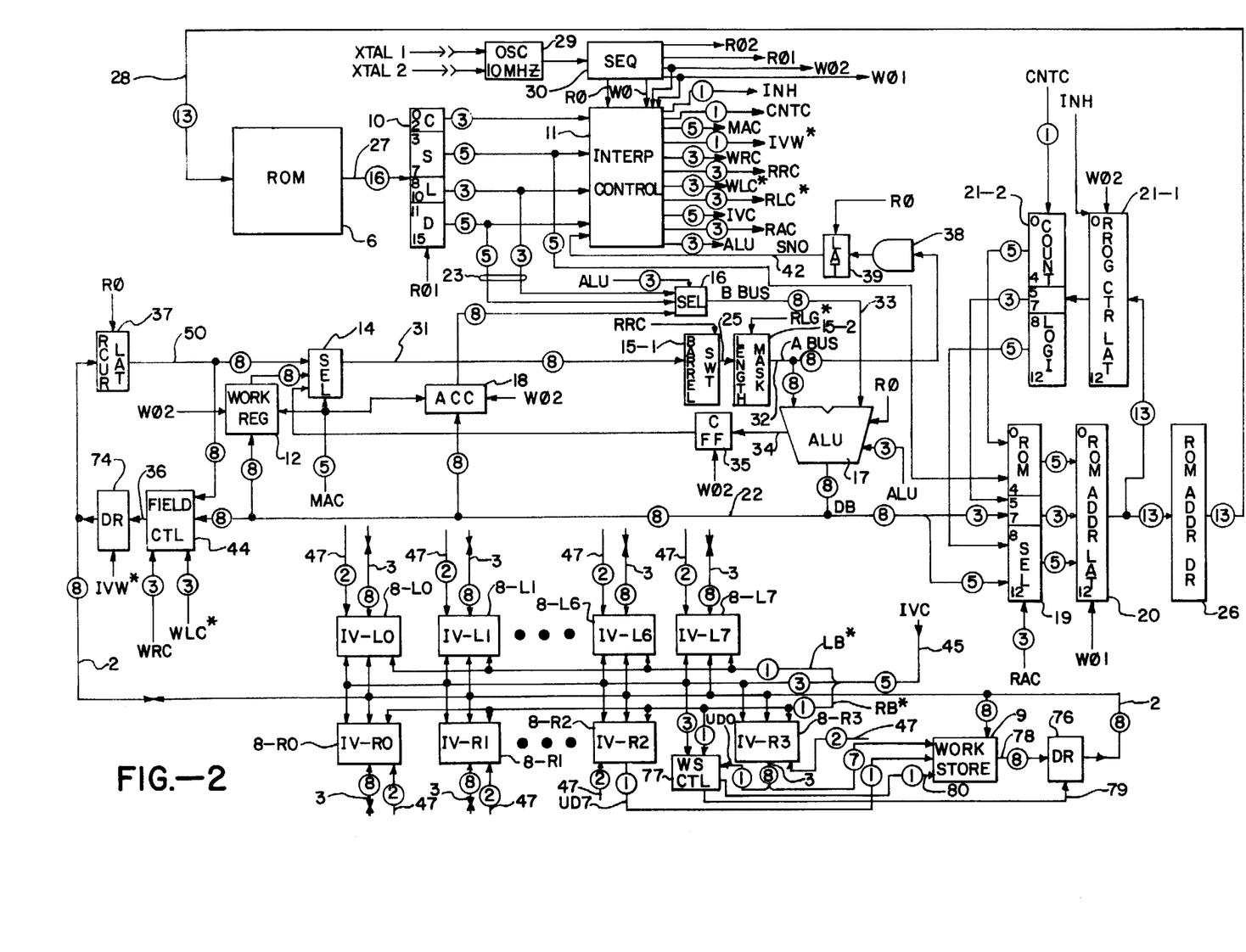
FIG. 2 depicts a further detailed block diagram of the controller utilized in FIG. 1.

Controller — FIG. 2

In FIG. 2, the controller 4 of FIG. 1 is shown in further detail. The read-only memory (ROM) 6 is addressed by 13-bit bus 28 from the address latches (ROM ADDR LAT) 20 through conventional address drivers (ROM ADDR DR) 26. The 13 binary bits define 8,192 locations in memory 6. While a read-only memory is preferred for cost economy, any addressable memory can be employed for memory 6. Each of the locations in memory 6 stores up to 16 instruction bits, I0, I1, . . . , I15 in locations BIT 0, BIT 1, . . . , BIT 15. Each time an address is presented on address bus 28, 16 bits of an instruction are gated out on bus 27 and are latched in the instruction register 10 by a R$\phi$1 clock signal.

Figure 6:
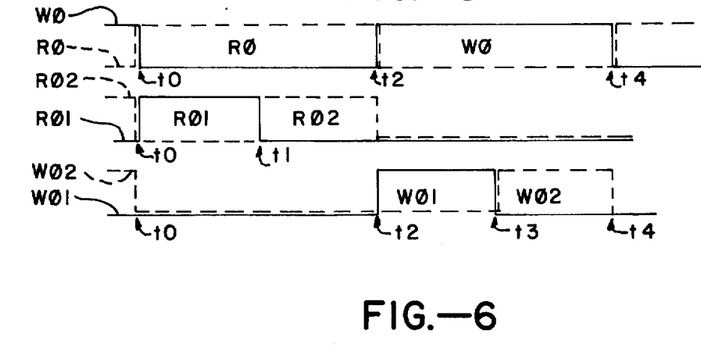
FIG. 6 depicts timing waveforms representative of the operation of the present invention.

Referring to FIGS. 2 and 6, the clock signals are derived from a sequencer 30 which is a conventional timing means driven, for example, by a crystal controlled 10 MHz oscillator 29. Sequencer 30 develops, for example, a 100 nanosecond read cycle signal R$\phi$ followed by a 100 nanosecond write cycle signal W$\phi$ as shown in FIG. 6. The read cycle is further divided into 50 nanosecond first and second segments by signals R$\phi$1 and R$\phi$2 and similarly the write cycle W$\phi$ is divided into 50 nanosecond segments by signals W$\phi$1 and W$\phi$2. The clock signals from sequencer 30 are distributed to many locations throughout the FIG. 2 apparatus to provide for the basic timing of operations. Once each cycle at R$\phi$1 time an instruction is latched in register 10 and is presented to interpreter control (INTERP CONTROL) 11. The instruction in register 10 provides as inputs to interpreter control 11 a 3-bit C field, a 5-bit S field, a 3-bit L field and a 5-bit D field. For convenience, the 3 bits in the C field are designated $C(x)$ where $x$ equals 0, 1 and 2. The five bits in the S field are referred to as $S(x)$ where $x$ equals 0, 1, . . . , 4. The 3 bits in the L field are referred to as $L(x)$ where $x$ equals 0, 1 and 2. The 5 bits in the D field are referred to as $D(x)$ where $x$ equals 0, 1, . . . , 4.

The interpreter control 11 also receives as inputs the clock signals R$\phi$, W$\phi$, W$\phi$1 and W$\phi$2 from sequencer 30. Also control 11 receives as an input the SN0 signal from the latch 39 which designates that all bits on the A bus 32 have a 0 state.

With the indicated inputs, the interpreter control 11 functions to provide a plurality of output control signals. The 1-bit CNTC line from control 11 connects the count logic 21-2 to signal that the count in the program counter latches 21-1 is to be incremented by +1.

The 5-bit MAC bus produces five control signals $MAC(x)$, where $x$ equals 0, 1, . . . , 4, which are input to the internal registers including the working registers 12, the selection circuit gates 14, and the accumulator 18. The $MAC(x)$ signals for $x$ equal to 1, . . . , 4 address the internal registers whenever $MAC(0)$ is 1. Whenever $MAC(0)$ is 0, the IV buffer stores are addressed.

The 1-bit IVW* bus is input to the driver 74 to determine when information is gated out to the IV bus 2.

The 3-bit WRC bus includes the three signals $WRC(x)$, where $x$ equals 0, 1 and 2, which are input to the output field control circuit 44 for controlling the starting bit of data to be shifted.

The 3-bit RRC bus includes the three signals $RRC(x)$, where $x$ equals 0, 1 and 2, which are input to the barrel switch 15-1 of the input field control circuit 15 for controlling the starting bit of data to be rotated.

The 3-bit WLC* bus includes the three signals $WLX(x)*$, where $x$ equals 0, 1 and 2, which are input to the store field control 44 for controlling the length of data selected.

The 3-bit RCL* bus includes the three signals $RCL(x)*$, where $x$ equals 0, 1 and 2, which are input to the length mask 15-2 in the input field control circuit 15 for controlling the length of data selected.

The 5-bit IVC bus includes the five signals RB*, LB*, SCMD, WCMD and W$\phi$2 which are input to control the IV buffer stores 8.

The 3-bit RAC bus includes the three signals $RAC(0)$, $RAC(5)$, and $RAC(8)$ which are input to control the ROM select circuitry 19.

The 1-bit INH line is input to the counter latches 21-1 to inhibit latching a new count at W$\phi$2 time if an XEC instruction is being executed.

The 3-bit ALU bus includes three or more signals input to the selection circuit 16 and the arithmetic and logic unit 17. The ALU control signals are conventional for controlling a standard arithmetic and logic unit 17 to perform standard functions commanded by the 3-bit instruction code from register 10.

The logical 1 or 0 value of the signals output from the interpreter control 11 are defined in terms of the logical level of the input signals in the following TABLE I. In TABLE I, a "." signifies a logical AND, a "v" signifies a logical OR, and a "*" signifies a loogical complement. The control unit 11 is any conventional unit, such as a read-only memory or other device, which produces a logical output in response to a logical input.

TABLE I

| | |
|---|---|
| $MAC(x)$ | = $[S(x)*.R\phi vD(x)*.W\phi.C0*vS(x)*.W\phi.C0.C1.C2*]*$ |
| | where $x$ = 0, 1, ..., 4 |
| $WRC(x)$ | = $[D(x+2)*.C0*.D0vS(x+2)*.C0.C1.C2*.S0]*$ |
| | where $x$ = 0, 1, 2 |
| $RRC(x)$ | = $[S(x+2)*.S0vL(x).S0*.D0*.C0*]*$ |
| | where $x$ = 0, 1, 2 |
| $WLC(x)*$ | = $[L(x).D0.C0*vL(x).S0.C0.C1.C2*]*$ |
| | where $x$ = 0, 1, 2 |

TABLE I-continued

```
RLC(x)*   =  [L(x).S0]*
             where x = 0, 1, 2
SCMD      =  Wφ.[C0*.D0*.D2.D3.D4vC0.C1.C2*.S0*.S2.S3.S4]
WCMD      =  Wφ.[C0*.D0vC0.C1.C2*.S0]
IVW*      =  [SCMDvWCMD]*
RB*       =  [Rφ.(S0.S1vD0.S0*) v Wφ.(C0*.D1vC0.S1)]*
LB*       =  [RB]*
CNTC      =  [C0.C1*.C2*vC0.C1.C2vC0.C1*.C2.SN0]*
RAC(0)    =  [C0.C1.C2vWφ1]*
RAC(5)    =  [C0.C1.C2vC0.C1*.S0*vC0.C1*.C2.SN0.S0*vWφ1*]*
RAC(8)    =  CNTC
INH       =  C0.C1*.C2*
```

In FIG. 2, the arithmetic and logic unit (ALU) 17 performs 8-bit unsigned 2's complement arithmetic. The unit 17 is conventional and carries out the ADD, the AND and the XOR (exclusive-or) instructions under control of the ALU bus from control 11 on two data inputs. The two data inputs to the unit 17 are the 8-bit A bus 32 from mask circuit 15-2 and the 8-bit B bus 33 from selection circuit 16. The inputs on the A and B buses are latched at Rφ time at the input of the ALU 17 and the result appears on the 8-bit destination bus(DB) 22 during the Wφ portion of each cycle. Unit 17 includes a high-order overflow output on 1-bit line 34 for use during an ADD instruction. If a 1-bit overflow occurs during an ADD instruction, the overflow is stored in a carry flip-flop(CFF) 35 at Wφ2 time.

Selection circuits 14 and 16 which determine the operand inputs to unit 17 are conventional circuits for selecting one output from several inputs. Selection circuit 16 operates in response to the ALU signals from control 11 and selection circuit 14 operates in response to the MAC signals from control 11. The 8-bit B bus 33 is selected from BIT 8 through BIT 10 and BIT 11 through BIT 15 of the instruction register 10 and the 8 bits from accumulator register 18. Selection circuit 14 selects output information onto the 8-bit source bus 31 from the 8-bit output from working registers 12, the 8-bit output from the receiver latches 37, or the 1-bit carry-out from flip-flop 35.

The information selected by circuit 14 on the source bus is input to the field control circuitry which includes the barrel switch 15-1 and the length mask 15-2. The barrel switch circuit 15-1 functions to end-around shift (rotate) the 8-bit input from bus 31 under control of the 3-bit RRC bus from control 11. The mask circuit 15-2 functions to force to 0 preselected bits in the rotated field from barrel switch 15-1 under control of the 3-bit RLC bus from control 11.

The source bus(SB) input bits to barrel switch 15-1 have the order SB0, SB1, . . . , SB7 and, in the absence of any masking or rotation, produce the A bus output bits in the order A0, A1, . . . , A7. The switch 15-1 and the rotate control(RRC) bits RRC0, RRC1, and RRC2 function in a conventional manner to rotate the sequence of SB bits on bus 31 by end-around shifting to produce rotated outputs. For example, if the bits RRC0, RRC1 and RRC2 are all 0's, then the output sequence on the 8-bit bus 25 is the same as the input sequence SB0, SB1, . . . , SB7. If the RRC bus bits are 110, signifying a 1-bit shift around then the input sequence SB0, SB1, . . . , SB7 is shifted with an output sequence on bus 25 of SB7, SB0, SB1, . . . , SB6. In a similar manner, if the RRC bits from control logic 11 are 100, signifying a 3-bit shift, the output sequence is SB5, SB6, SB7, SB0, SB1, SB2, SB3, SB4.

The mask circuit 15-2 receives on bus 25 the end-around shifted source bus bits and transmits selected bits to the A bus 32 while forcing other bits to 0. Bits are forced to 0 as a function of the 3-bit RLC* field from the control logic 11 in a conventional manner. If the 3 bits RLC0*, RLC1* and RLC2* are 110, representing selection of a 1-bit field, then seven high-order bits A1, A2, . . . , A7 on bus 25 are forced to all 0's while A0 has its unaltered 1 or 0 state as derived from switch 15-1. If the RLC* bits are 010, representing the selection of a 5-bit field, then the 5 lower-order bits A0, . . ., A4 from switch 15-1 passed unaltered and all higher-order bits A5, . . ., A7 are forced to 0. If the RLC* bits are 111 (the L field if 000) representing a field length of 8 bits, all bits pass unaltered.

The barrel switch 15-1 and the length mask 15-2 are conventional circuits operated in a conventional manner.

In FIG. 2, the seven 8-bit working registers 12, the 8-bit accumulator 18 and the 1-bit carry flip-flop 35 constitute the addressable internal data registers of the interpreter. Those registers are addressed by 4 bits (MAC 1, . . . , MAC 4) of the 5-bit MAC bus. The seven registers 12 are designated by the octal addresses 01, 02, 03, 04, 05, 06 and 11 which have corresponding binary values 0001, 0010, 0011, 0100, 0101, 0110, and 1001, respectively. The accumulator register 18 is designated by octal address 00 (binary 0000) and the carry flip-flop 35 is designated by octal address 10 (binary 1000).

The addressable internal data registers provide temporary storage for data. Data transfers between the internal registers are always on a full 8-bit basis. Transfers to the 8-bit IV buffer stores 8, however, may be with a field length, L, of any value from 1 to 8 bits. The bit numbering for the eight bits in each of the internal data registers and in the buffer stores is BIT 0, BIT 1, . . , BIT 7 proceeding from left to right. The most significant bit is BIT 0 and the least significant bit is BIT 7.

In addition to the octal addresses of the internal data registers previously given, the octal address 07 (binary 0111) is designated for the address specification of the left bank of IV buffer stores(IVL) and octal address 17 (binary 1111) is designated for the address specification of the right bank of IV buffer stores(IVR). The IVL and IVR addresses (07 and 17) are utilized whenever MAC0 is 0 for setting the enable latch in an addressed one of the IV buffer stores while all non-addressed IV buffer stores have the enable latch reset. Specifically, when register octal address 07 is specified (IVL), an 8-bit address on IV bus 36 is detected by one out of a possible of 256 left bank stores and has its enable latch set provided SCMD is 1, WCMD is 0, LB* is 0, and Wφ2 is 1. Similarly, when register octal address 17 is specified (IVR), an 8-bit address on IV bus 36 is detected by one of 256 right bank buffer stores, or an equivalent working store location, provided SCMD is 1, WCMD is 0, RB* is 0 and Wφ2 is 1.

The accumulator register 18 is used in the ADD, the AND, and the XOR instructions where its contents are combined with the source operand from source bus 31. The contents of the accumulator 18 for those instructions are not explicitly referenced in the instructions unless it is also the source of both input operands or the destination of the result operand. Under the latter case, the accumulator register is referenced in the same manner as any other register. The contents of the accumulator register 18 are unchanged by the ADD, AND and XOR instructions unless that register has been specified in the instructions as the destination register for the result operand. The accumulator register may be addressed like any other data register for the NZT, XMIT and XEC instructions.

The internal address space of the internal registers includes the eight locations 0000, 0001, ..., 0111 and the eight locations 1000, 1001, ..., 1111. Twelve of these sixteen internal address locations are occupied in the manner previously indicated. The four address locations 1010, 1011, 1100, and 1101 are empty and produce a null condition if addressed. The sixteen internal address locations are addressed by the signals MAC 1, MAC 2, ..., MAC 4 from the 5-bit MAC bus. The fifth bit MAC 0, functions as an enable signal to enable the output of an internal register addressed by the signals MAC 1, ..., MAC 4. Whenever MAC0 is 0, the addressed internal register provides an output. Whenever MAC0 is 1, no output occurs from an internal register since when MAC0 is 1 an IV buffer store is accessed to provide a source operand or store a result operand. The particular buffer store accessed when MAC0 is 1 is the particular one in the left or right bank which was last addressed when MAC0 was 0 and the left bank select address 0111 or the right bank select address 1111 was accessed. In this manner, the address of an external buffer store is specified by addressing an internal address (0111 for a left bank buffer store or 1111 for a right bank buffer store).

In FIG. 2, the instruction address formation apparatus includes the 13-bit ROM address latches 20 which are latched at time W$\phi$1 with addresses selected by the ROM select (ROM SEL) circuits 19. Select circuits 19 function under control of the 3-bit RAC bus to select various input fields for address bits, BIT 0 through BIT 12. Address bits BIT 8 through BIT 12 are selected under control of RAC(8) either from the high-order 5 bits of the arithmetic and logic unit 17 or from the high-order 5 bits from the program counter latches 21-1 via the +1 count logic 21-2. Address bits BIT 5 through BIT 7 are selected under control of RAC(5) either from the remaining bits of the arithmetic and logic unit 17 or from BIT 5 through BIT 7 from the program counter latches 21-1. Address bits BIT 0 through BIT 4 are selected under control of RAC(0) either from the low-order count of the program counter latches 21-1 or from the BIT 3 through BIT 7 S field of the instruction register 10.

The selection of which inputs are latched into the address latches 20 is under control of the control 11. The control 11 receives the 3-bit instruction code C0, C1, C2 from the instruction register 10 and also receives a zero detect signal, SN0, on line 42 from a zero detect latch 39. The zero detect latch 39 is latched at the R$\phi$ time with a signal from a zero detector 38. Zero detector 38 is, for example, a 8-way NAND gate which senses the all 0's condition of the source field of A bus 32 and responsively provides a signal to latch 39 when the condition is detected.

The 13-bit ROM address stored in latches 20 at W$\phi$1 time is transferred, under most conditions, to the program counter latches (PROG CTR LAT) 21-1 at W$\phi$2 time. The current count in latches 21-1 is incremented by 0 or +1 by count logic 21-2. The address stored in latches 20 is determined by the RAC bus and the CNTC line as determined by TABLE I and as tabulated in the following COUNT LOGIC, TABLE II. In the following TABLE II, the ROM address latches 20 are always latched at the W$\phi$1 time. The program counter latches 21-1 are always latched at the W$\phi$2 time except that during an XEC instruction an INH signal from control 11 inhibits the W$\phi$2 signal from loading a new count into the program counter latches 21-1.

TABLE II

| INSTRUCTION | $C_2$ | $C_1$ | $C_0$ | COUNT LOGIC INCREMENT PROG. CTR. | ROM SEL |
|---|---|---|---|---|---|
| MOVE | 0 | 0 | 0 | +1 | CTR LAT(0–12) |
| ADD | 1 | 0 | 0 | +1 | CTR LAT(0–12) |
| AND | 0 | 1 | 0 | +1 | CTR LAT(0–12) |
| XOR | 1 | 1 | 0 | +1 | CTR LAT(0–12) |
| XEC | 0 | 0 | 1 | +0 | IF IV; ALU(3–7)+CTR LAT(0–7) IF REG; ALU(0–7)+CTR LAT(0–4) |
| NZT | 1 | 0 | 1 | SN0=0; +1  SN0=1; +0 | CTR LAT(0–12) IF IV; ALU(3–7)+CTR LAT(0–7) IF REG; ALU(0–7)+CTR LAT(0–4) |
| XMIT | 0 | 1 | 1 | +1 | CTR LAT(0–12) |
| JMP | 1 | 1 | 1 | +1 | ALU(0–7)+(S of IR) |

In FIG. 2, the 8-bit destination bus 22 connects to the ROM select circuit 19, to the accumulator 18, to the working registers 12 and to the destination field control circuit 44. The destination field control circuit 44 functions, in response to the WLC* and WRC signals from interpreter control 11, to provide output data to the driver circuit 74. Driver circuit 24 connects to the IV bus 2.

Field control circuit 44 is a conventional device for selecting and aligning input data from the 8-bit latch bus 50 and from the 8-bit data bus 22 to provide 8-bit output data on bus 36 which connects through the drivers 74 to IV bus 2. the input data bus (DB) 22 carries bits DB0, DB1, ..., DB7. The input latch bus (L) 50 carries bits L0, L1, ..., L7. The output bus 36, after connection through the drivers 74 to IV bus 2, carries the output bits IV0, IV1, . . . , IV7. The 0 bits are the highest order and the 7 bits are the lowest order. The WRC signals specify in binary notation, the lowest-order bit of the output IV bits in which the lowest-order bit of the DB bits is written. The WLC* signal specifies, in binary notation, the number of DB bits which are selected from the DB bus 22 for transmission to the IV bus 2. The remainder of the bits to make a total of 8 for transmission to the IV bus are taken from the L bus 50. By way of example, it is assumed that the WRC signal is 100 specifying that the lowest-order bit of DB bus 22, DB7, will be written into the L4 position of IV bus 2 because L4 is the fourth bit (binary 100) over from the lowest-order bit L7. It is also assumed by way of example that WLC equals 011 (WLC* equals 100) indicating a length of 3 bits. The 3-bit length indicates that bits DB5, DB6, and DB7 from bus 22 will be transferred to the IV bus. The WRC signal indicates that the DB5, DB6, DB7 bits will be located in the IV2, IV3 and IV4 bit locations of the IV bus. The IV0, IV1, IV5, IV6, and IV7 output locations of the IV bus contain the L0, L1, L5, L6, and L7 bits, respectively, from bus 50. With the WRC and WLC signals as indicated, the 8 IV output bits contain L0, L1, DB5, DB6, DB7, L5, L6 and L7.

The driver circuit 74 includes conventional gates which transmit the 8 bits of bus 36 onto the 8-bit IV bus 2 whenever an IVW* signal is 0 as provided by the interpreter control 11.

In FIG. 2, each of the IV buffer stores 8 receives the 8-bit IV bus 2 and 4 bits of the 5-bit IVC bus from interpreter control 11. All of the buffer stores 8-L0, . . . , 8-L7 in the left bank receive three common lines SCMD, WCMD, and WФ2 and the LB* line where the LB* line is utilized to enable the left bank of buffer stores. All of the right bank buffer stores 8-R0, . . . , 8-R3 receive the three common lines SCMD, WCMD and WФ2 and the single RB* line where the RB* line is utilized to enable the right bank of buffer stores. Each of the buffer stores 8 is connected by an 8-bit user data bus 3 and a 2-bit command bus 47 to user devices or to the working store as shown in FIGS. 1 and 2. Each IV buffer store connected to a user device provides 8 independent control points on a bus 3 which are individually addressable by the user system with commands on a bus 47. Each IV buffer store may be used in either a bi-directional or a uni-directional mode in which the bus 47 commands define the direction of data flow between the user device and the IV buffer store.

Each of the IV buffer stores, except buffer store 8-R3, contains a non-alterable address. Each buffer store may be assigned a non-alterable different and unique address or two or more buffer stores may have the same non-alterable address. If each buffer store is assigned a unique address, the interpreter 5 can uniquely address each buffer store. When a buffer store address is placed on the IV bus 2 and appropriate control signals are applied on the IVC bus, a decoder in each buffer store is activated to detect whether the address on the IV bus is the address of the respective IV buffer store. Any buffer store recognizing its preassigned address on the IV bus enables itself and stores an enable condition. Each buffer store which does not recognize its address on the IV bus disables itself and stores a disable condition. Thereafter, all subsequent read/write operations from the interpreter 5 to the buffer stores are carried on with only enabled buffer stores. The accessing of locations in addressed buffer stores in on a variable field length basis. For 8-bit IV buffer stores, the field length is from 1 to 8 bits. The user read and write operations between a user device and an IV buffer store occur irrespective of whether the particular store is enabled or not for communication with the interpreter.

Figure 3:
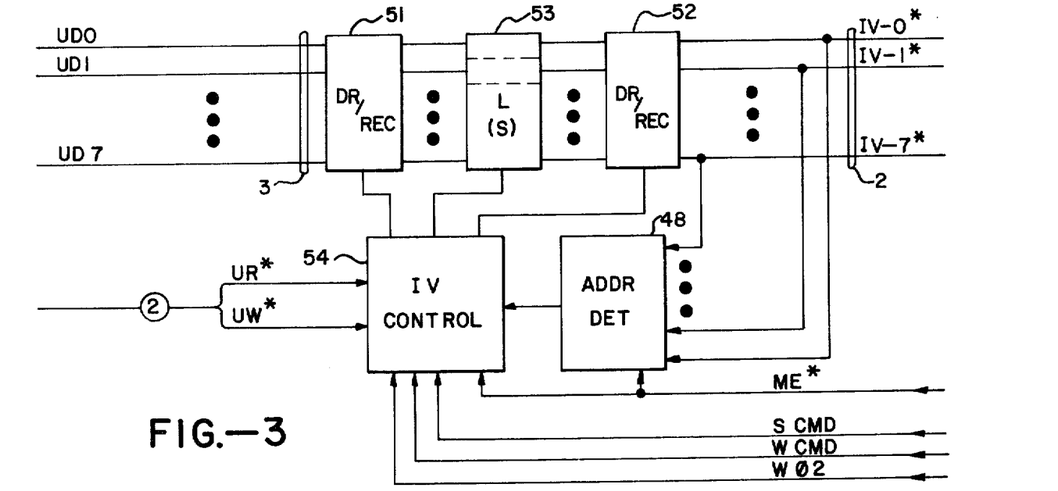
FIG. 3 depicts a block diagram of one interface vector(IV) buffer store representative of those utilized in FIGS. 1 and 2.

IV Buffer Store — FIG. 3

In FIG. 3, a general block diagram of a typical IV buffer store 8 is shown. The buffer store includes 8 latches 53 which are connected in common through drivers and receivers (DR/REC) 51 to the 8-bit user device bus 3 and through drivers and receivers (DR/REC) 52 to the 8-bit IV bus 2. The IV control 54 is responsive to the user command bus 47 which carries the signals UR* and UW*. Also the IV control 54 is also responsive to four processors control commands from the 5-bit IVC bus 45 which carries the signals WФ2, SCMD, WCMD and ME*. The ME* signal line in each of the buffer stores of which the IV buffer store of FIG. 3 is typical connects either to the RB* line or the LB* line of the IVC bus 45 depending whether or not the particular buffer store is in the right bank or the left bank, respectively, of FIG. 2. In FIG. 3, the address detector 48 receives the 8 lines from the IV bus 2. Detector 48 functions to detect whenever an address appears on the IV bus 2 which matches a preselected address stored in detector 48.

The buffer store of FIG. 3 has three modes for communicating with the interpreter 5 of FIGS. 1 and 2. The three modes are read out (to the interpreter), write (information from the interpreter), and address enable/disable. In the read out mode, SCMD is 0, WCMD is 0, and IVW* is 1,and ME* (from RB* or LB*) is 0. In the write mode, WCMD is 1, SCMD is 0, WФ2 is 1, IVW* is 0 and ME* (from RB* or LB*) is 0. For the address enable/disable mode, SCMD is 1, WCMD is 0, IVW* is 0, WФ2 is 1, and ME* (from RB* or LB*) is 0.

IV Buffer Store Detail — FIG. 4

In FIG. 4, the buffer store of FIG. 3 is shown in further detail. The buffer store includes the 8 latches 56-0, . . . , 56-7. The latches receive input data on their D inputs which are attached to the group of receiver gates 57 and the group of receiver gates 58. The gates 57-0, . . . , 57-7, when energized by a 0 from the UW* line, present input data from the UD bus 3 lines UD0, . . . , UD7 to the latches 56-0, . . . , 56-7, respectively. Similarly, gates 58-0, . . . , 58-7 present input data to latches 56-0, . . . , 56-7, respectively, from the IV bus 2 when appropriately enabled by an interlock circuit 60 in the IV control 54. The interlock circuit 60 is energized by a WCMD signal but prevents the gates 58 from being enabled whenever the gates 57 are enabled. In this manner, a writer operation specified by a UW* 0 from a user device takes priority over a write from the IV bus commanded by a 1 on the WCMD line.

The Q output from each of the latches 56-0 through 56-7 connects to the tri-state driver gates 62 and 63. The user driver gates 62-0 through 62-7 are connected to the outputs UD0 through UD7, respectively. Similarly, the IV driver gates 63-0 through 63-7 produce inverted outputs to form the lines IV-0* through IV-7*. The gates 62 and 63 are tri-state devices. The two active states are a logical 1 or a logical 0 determined by the Q output of the respective latch whenever the respective control line 64 or 65 is enabled. Whenever the respective lines 64 and 65 is not enabled, the output from the respective gates 62 or 63 are in the third state which is a low power state which appears as a very high impedance. The control line 64 is derived from the NOR gate 66 and the control line 65 is derived from the NOR gate 67. Gate 66 enables the gate 62 whenever a read signal appears on the UR* line provided that a write command does not appear on the UW* line. Similarly, gate 67 enables the gate 63 whenever the enable latch 68 is set at a time when the ECMD signal is present and WCMD and the ME* commands are present.

The reading of data into the latches 56 occurs only at a time when the Wφ2 signal occurs. The Wφ2 signal is applied through AND gate 69 or 70 to line 49 whenever UW* is 0 for writing data from the user bus 3 or whenever a WCMD is 1 for writing data from the IV bus 2 provided the write is not inhibited in the interlock circuit 60.

The EXCLUSIVE-OR gates 71-0 through 71-7 together with the fuse circuits 72-0 through 72-7 form the address detector 48 of FIG. 3. One input to the EXCLUSIVE-OR gates 71 is from the IV bus lines and the other input is from a fuse circuit 72. The circuits 72 are appropriately set to a logical 1 or a logical 0 level (for example by blowing a fuse element or not) thereby forming a fixed address for the buffer store of FIG. 4. The EXCLUSIVE-OR gates 71 function to compare the information on the IV bus 2 with the information permanently stored in the circuits 72. If all of the EXCLUSIVE-OR gates 71 detect a comparison, a 1 is applied to the D input of latch 68. Latch 68 is clocked by AND gate 73 at Wφ2 time whenever SCMD is 1 and ME* is 0 to set the Q output of latch 68 to indicate that the FIG. 4 buffer store is enabled. A 1 on the Q output of latch 68 enables gate 61 to pass WCMD 1 signals and a 0 on the Q* output of latch 68 enables NOR gate 67 to pass 0 SCMD and WCMD signals provided ME* is also 0. All 0's into NOR gate 67 provides a 1 on line 65 which enables gates 63. All 1's into gate 61 forces line 55 to 1 to enable gates 58.

Working Store — FIG. 2

In FIG. 2, the working store 9 is a conventional memory which stores, in one example, 256 8-bit bytes of data. The working store 9 is configurated, for example, with standard 82S16 memory chips manufactured by Signetics Corporation. Eight of the chips are utilized for a 256-byte memory. In one embodiment of the present invention, the working store 9 is divided into pages of 128 bytes per page. Of course, no pages or any number of pages can be utilized.

The working store 9 is addressed by eight address bits. Seven of the address bits are derived as bits UD1, . . . , UD7 directly on the UD bus 3 from the buffer store 8-R3. UD0 from buffer store 8-R3 is input to the working store control (WS CTL) 77 to distinguish between IV buffer store addresses 0 through 127 and working store addresses 128 through 256.

The buffer store 8-R3 is substantially identical to the typical buffer store of FIG. 4 but has minor modifications. The buffer store 8-R3 stores the 7 address bits for working store 9 to form the low-order address bits as bits UD1, UD2, . . . , UD7. The FIG. 4 circuit is modified to form the buffer store 8-R3 in that the WCMD line is removed as an input to gates 59, 61, and 67. In place of the WCMD line, the SCMD line is connected. With this modification, each energization of the SCMD signal as a 1 at a time when the RB* signal is 0 during Wφ2 time causes an address to be stored in latches 53. The content of latch 56-0 is utilized to distinguish between addresses between 128 and 256 assigned to the working store 9 and addresses between 0 and 127 assigned to the right bank buffer stores such as buffer stores 8-R0, 8-R1 and 8-R2. In the particular configuration of the present example, a total of up to 126 right bank buffer stores can be included in addition to the buffer stores 8-R2 and 8-R3 which are utilized to service the working store 9. If the bit IV0 for a buffer store address, as it appears on the IV bus 2 and as stored in latch LAT0, is a 0, the working store 9 is not enabled but if it is a 1 the working store 9 is enabled. The working store control 77 recognizes the 1 or 0 condition of LAT0 in buffer store 8-R3 by receiving line UD0.

The 2-bit control bus 47 for buffer stores 8-R3 and 8-R2 are connected to effect a unidirectional output from the buffer stores to the working store control 77 and the working store 9.

In FIG. 2, the buffer store 8-R2 is employed to store a page identification in working store 9. In the particular embodiment described, two pages are employed each including up to 128 8-bit bytes. The bit in LAT 7 of buffer store 8-R2 appearing on output UD7 determines to which page a particular low-order address from buffer store 8-R3 relates. The UD7 bit from store 8-R2 serves as the high-order address bit for working store 9. Additional pages of working store 9 can be added up to a total of 256 if all 8 bits in buffer store 8-R2 are employed for page selection.

The working store control 77 is conventional logic circuit or a read-only store which functions with the buffer store and working store indicator bit UD0 input from buffer store 8-R3 and the RB*, SCMD, WCMD, and Wφ2 lines input from the IVC bus. In response to these inputs, working store control 77 produces outputs to read out from or write into store 9. A read out from store 9 connects the addressed location via 8-bit bus 78 to the drivers 76. A read out occurs when SCMD is 0, WCMD is 0, UD0 from store 8-R3 is 1 and RB* is 0 all of which produce a read signal RWS on line 79. Under these conditions, information is read from the low-order address of store 9 specified by the UD1 through UD7 address bits from buffer store 8-R3 in the one of two pages specified by the bit UD7 from buffer store 8-R2. The bus 72 connects through conventional tri-state drivers 76 (which are like the drivers 63 in FIG. 4) directly to the IV bus 2. Drivers 76 are enabled by a 1 RWS signal on line 79.

In order to write information into working store 9, the IV bus 2 is connected directly as an input to store 9. A write signal WWS is output from working control 77 on line 80 whenever WCMD is 1, UD0 from store 8-R3 is 1, RB* is 0 and Wφ2 is 1. The write signal WWS is input to working store 9 causing the data from IV bus 2 to be stored at the address specified by the buffer stores 8-R2 and 8-R3.

Figure 5:
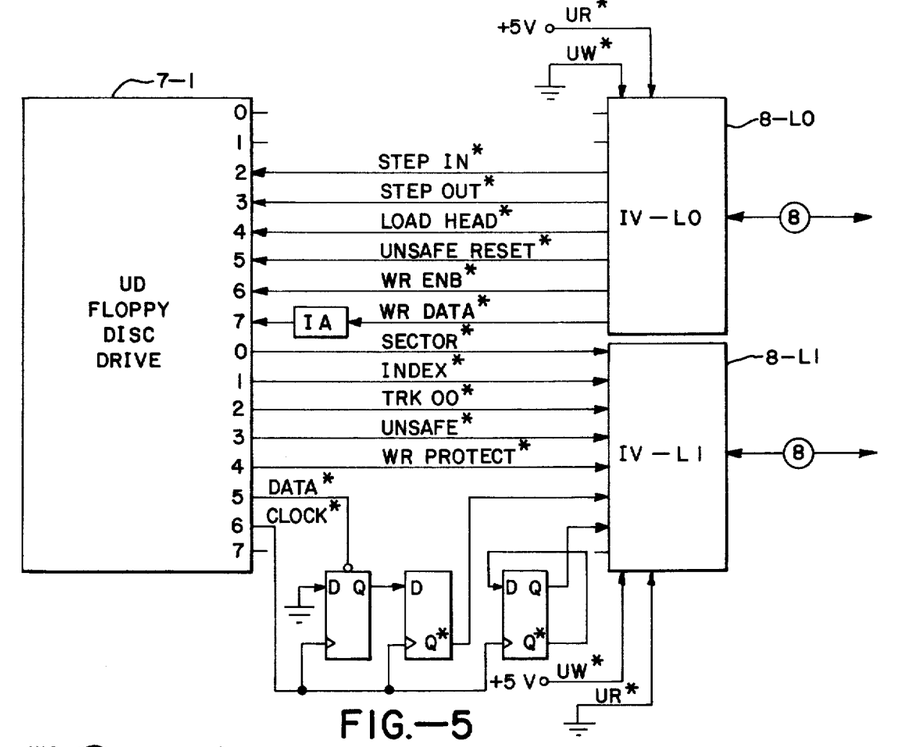
FIG. 5 depicts the detailed interconnections between buffer stores of the FIG. 4 type and a user device in the form of a floppy disc drive.

User Device/Buffer Store Interconnect — FIG. 5

In FIG. 5, the buffer stores 8-L0 and 8-L1 are identical to the like indicated devices in FIGS. 1 and 2. As a typical example, the buffer stores are interconnected to a floppy disc drive 7-1. The floppy disc drive in one preferred embodiment is a Memorex model 561 drive. Buffer store 8-L0 is connected with the UR* input positive (1) and the UW* input at ground (0) so that the store always outputs data to the disc drive 7-1.

Similarly, the buffer store 8-L1 is connected with UW* positive (1) and UR* ground (0) so that data is always connected from the disc drive 7-1 to the store 8-L1.

Instruction Set

The eight instructions in the following TABLE III have one of four formats as listed in the following TABLE IV. Each of the instructions has 16 bits, namely, BIT 0, BIT 1, ..., BIT 15. The instructions, depending upon the format may contain 1, 2, or 3 operands. In all instructions, BIT 0 through BIT 2 is the operation (OP) code which specifies one of the eight instructions of TABLE III below.

TABLE III

| INSTRUCTION SET | |
|---|---|
| OP CODE | INSTRUCTION |
| 000 | MOVE S, L, D |
| 001 | ADD S, L, D |
| 010 | AND S, L, D |
| 011 | XOR S, L, D |
| 100 | XEC I, L, S |
| 101 | NZT I, L, S |
| 110 | XMIT I, L, S |
| 111 | JMP A |

TABLE IV

INSTRUCTION FORMAT

| | 0 2 3 | 7 8 10 11 | 15 | |
|---|---|---|---|---|
| F I | OP  S | L | D | MOVE,ADD,AND,XOR |
| | REG/IV | REG/IV | | |
| | 0 2 3 | 7 8 | 15 | |
| F II | OP  S | I | | XMIT,XEC,NZT |
| | REG | LITERAL DATA | | |
| | 0 2 3 | 7 8 10 11 | 15 | |
| F III | OP  S | L  I | | XMIT,XEC,NZT |
| | IV | LITERAL DATA | | |
| | 0 2 3 | | 15 | |
| F IV | OP | A | | JMP |
| | | ROM ADDRESS | | |

The FI format is employed for the MOVE,ADD,AND, and XOR (exclusive-or) instructions. In format F1, BIT 3 through BIT 7 represents the source(S) field. BIT 8 through BIT 10 represent the length(L) field. BIT 11 through BIT 15 represent the destination(D) data address.

The FII format is employed in connection with the XMIT,XEC,NZT instructions. In format FII, BIT 3 through BIT 7 represent the S field. BIT 8 through BIT 15 represent the immediate(I) data field.

The FIII format is also employed for XMIT,XEC,NZT instructions. BIT 3 through BIT 7 are employed for the S field. BIT 8 through BIT 10 are employed for the L field. BIT 11 through BIT 15 are employed for the I field.

The format FIV is employed for the JMP instruction BIT 0 through BIT 2 are used for the OP code. BIT 3 through BIT 15 are used for the ROM address(A).

In the above instruction formats, the source(S) or destination(D) address are either a register address-(REG) or an IV buffer store bit address(IV). The address type is determined by the BIT 0 of the S field and BIT 0 of the D field. If BIT 0 is 0, then BIT 1 through BIT 4 define a register address in binary notation. If BIT 0 is 1 then, BIT 2 through BIT 4 define a buffer store IV bit address in binary notation. The address range within any IV buffer store is 0, 1, ..., 7. If BIT 0 is 1 indicating that a buffer store bit address has been defined, then BIT 1 of the S or D field is employed to specify a left bank or right bank selection. If when BIT 0 is 1, BIT 1 is 0, a left bank buffer store is specified. If when BIT 0 is 1, BIT 1 is 1 then a right bank IV buffer store is specified.

In the above instruction formats, the L field significance is determined by the type of instructions and by the type of operands.

If a MOVE, ADD, AND or XOR instruction specifies a REG-REG operation (i.e., BIT 0 for both S and D is 0 specifying register addresses) the L field specifies a right end-around shift of the L field value of the source register data before the instruction is executed. However, if one of those instructions specifies a REG-to-IV or an IV-to-IV operation (i.e., BIT 1 of either the S or D field is a 1 thereby specifying an IV destination address), the L field specifies the length of the IV data.

If an XMIT,XEC, or NZT instruction specifies a register for the S operand (BIT 0 of the S field is 0), the L field becomes the left most 3 bits of the I field (i.e., I equals L cat D). If one of those instructions specifies an IV bit address in the S operand (i.e., BIT 0 of the S field is a 1), the L field specifies the length of the IV data. In this latter case, the maximum length of the I data is 5 bits (I equals D). If the length of the IV data is greater than 5 bits, a number equal to L minus 5 of leading 0's are appended to the I data, but the operation itself determines the length of the data field utilized. For an XMIT instruction, L bits are transferred with L minus 5 leading 0's. For the XEC instruction, only 5 bits are used to form the address value catenated to the program counter count. For the NZT instruction, L bits of the S field are tested for non-zero and the 5 bits of the I field are used to form the address value.

If L specifies register rotate (right end-around shift) or an IV field length (the conditions where L is not part of the immediate data), L may have any value from 1 to 8 where 8 is represented by L=000.

The I data field for the XMIT,XEC, or NZT instruction is either an 8-bit field or a 5-bit field depending upon the nature of the S operand. If the S operand is a register address (BIT 0 of S is 0) the I field is composed of the L and D fields and totals 8 bits. If the S operand specifies an IV bit bus (BIT 0 of S is 1), the I data is a 5-bit field, BIT 11 through BIT 15.

In the JMP instruction, BIT 3 through BIT 15 are considered as a single 13-bit address. The 13 binary bits represent an address in the ROM between 0 and 8191.

MOVE Instruction

In the MOVE instruction, the contents of S are moved to D. If both S and D are register addresses, L specifies a right end-around shift (rotate) of the S field before the move is performed. The contents of S are unchanged unless D is the same as S. If either or both S and D are IV bit addresses, L specifies the length of the IV data and no end-around shift is formed. If the data flow is between a REG and an IV buffer store, only the L right most bits of the register are utilized. Specifically, the MOVE instruction of an operand from the IV buffer store to a register will right-adjust the data with left leading 0's as necessary. Specifically, a MOVE from a register to an IV buffer store will move the L right most bits. If the data flow is from an IV buffer store to an IV buffer store, L specifies the length of both IV fields. An IV bit address specifies the right most bit (K) of the IV data. If L is greater than K+1, (i.e., if the IV field is not contained within BIT 0 through BIT K), a wrap around of data will occur on a read operation and the most significant bit will be lost on a write operation. If a MOVE is specified from a left bank buffer store to a right bank buffer store or vice versa, the complete source left word is transferred with BIT 0 transferred to BIT 0, BIT 1 transferred to BIT 1 and so forth with the exception that the right most bits specified by S and L will be stored in the bit position specified by D and L.

ADD, AND, XOR Instructions

The ADD, AND and the XOR instructions are performed on the operand specified by the contents of S and the contents of the accumulator register(ACC) and the result is stored in D. The contents of the ACC register or the location specified by S are unchanged unless D specifies ACC or D specifies S, respectively. If both S and D are register addresses, the contents of S are right end-around shifted L places before being combined with the contents of ACC.

If either or both S and D are IV bit addresses, L specifies the length of the IV data and no end-around shift is performed. If S is a register, the full 8 bits are combined with the contents of ACC. If S specifies an IV buffer store address, the L bits read from the IV buffer store are right-adjusted with 0's filled in on the left to complete the 8-bit field. In both cases, the instructions ADD, AND, or XOR produce an 8-bit result. If D is a register, the full 8-bit result is stored in the register. If D is an IV buffer store address, the L right most bits of the result are stored into the IV buffer store and the unaddressed bits in the IV buffer store are unaltered by the store operation.

If S and D specify different IV buffer stores, then the data specified by the S IV buffer store will replace all bits of D with BIT 0 going to BIT 0 and so on except that the bit position of D specified by D and L will contain the results of the arithmetic operation.

XEC Instruction

The XEC instruction takes the ROM address specified by the current contents of the program counter and alters that address by catenating the address with a value determined by the S, L and I fields. If S is a register address, the length of the I field is 8 bits and the catenating value is formed by the sum of the I and S fields. If S specifies an IV bit address, then the I field is 5 bits and the L specifies the length of the IV bit field. L may be greater than 5. If S specifies a register address, an 8-bit value formed from the sum of the I field and the contents of the register specified by the S is catenated to the leading 5 bits of the address in the program counter. If S specifies an IV bit address, an 8-bit value is formed from the sum of the I field (including 5 bits with high-order leading 0's) and the contents of the IV data field (the number of bits specified by L with leading 0's as necessary), but only the right-most 5 bits are catenated to the leading 8 bits of the ROM address in the program counter. In the case of a register address, the address range (range size) is 256 bits. In the IV bit address case, the address range is 32 bits.

NZT Instruction

In the NZT instruction, the control logic causes the ROM address specified by the program counter to be altered by catenating that address with the I field provided that the contents of a location specified by S is not all 0's. The length of the I field is 8 bits if S specifies a register address. The length of the I field is 5 bits if S specifies an IV bit address where the L address specifies the length of the IV bit field. L may be greater than 5. If S specifies a register address, the 8-bit I field is catenated to the leading 5 bits of the ROM address in the program counter provided S does not equal 0. If S specifies an IV bit address, the 5-bit I field is catenated to the leading 8 bits of the ROM address specified by the program counter provided S does not equal 0. In the case of a register address, the address range is 256 and the case of an IV bit address, the address range is 32.

XMIT Instruction

The XMIT (transmit) instruction takes the I field and transmits it to the address specified by S. If S is a register address, the I field is 8 bits. If S is an IV bit address, the I field is 5 bits and L specifies the length of the IV data field. If L is greater than 5, then L minus 5 leading 0's are appended to the I field when it is transmitted to the IV buffer store. If the IV bit address is K and L is greater than K+1 (i.e., the IV data field is not contained within BIT 0 through BIT K), the L minus (K+1) left-most bits of the I field are not transmitted.

JMP Instruction

The JMP (jump) instruction causes the A field to be placed in the program counter thereby effecting an unconditional jump to the ROM address specified by the A field. The 13-bit A field specifies a maximum address value of 8191. If addresses have not been specified and a JMP instruction causes a jump to a non-existent ROM address, that is an address beyond the range specified, the apparatus does not detect the non-existent condition. Subsequent ROM accesses will return all 1's which will be decoded as JMP 8191. This address under these conditions is a non-existent address and the apparatus will be locked in this cycle.

Operation

The apparatus of the present invention is highly flexible and can be programmed to carry out many control functions. As an example, the user device(UD) 7-1 in FIG. 1 is a floppy disc interconnected as shown in FIG. 5. The user device 7-2 of FIG. 1 is a keyboard/printer device, such as an IBM Selectric typewriter. Information in large blocks is stored in the floppy disc. The keyboard/printer allows the keyboard to direct data to the printer output. Inputs via the keyboard are used to modify data stored in the floppy disc. The working store 9 is employed to store small data blocks from the floppy disc. Data blocks in the working store are reviewed and edited by a human operator under control of controller 4. In such a system, the program of instructions in the memory 6 continuously monitors the output from the keyboard of device 7-2. For example, an XEC instruction is repeatedly executed until a completed input from user device 7-2 is observed in the buffer store 8-4. Upon receiving a completed input from device 7-2, the XEC instruction shifts to a new sequence of instructions as a function of the input from user device 7-2. While many alternatives exist in programming, the following program in TABLE V is a useful example for explaining the system operation.

low-order address, is specified by the R1 field. In FIG. 2, the ROM selection circuitry 40 causes the table address to be formed as a combination of the S field catenated with the R1 field stored in the R1 register during the I2 instruction. In the particular example chosen for explanation, the field in register R1 is 000 indicating the first instruction in the table. The instruction I5 causes the bits 101 to be transmitted to the 3-bit field commencing with BIT 6 of the buffer store last addressed. The last addressed buffer store was buffer store 8-L0 which was addressed in the I3 instruction. The 101 signal has the effect of not enabling the write signal (WR ENB*) resetting the unsafe signal (UNSAFE RESET*) and unloading the head (LOAD HEAD*).

The instruction I6 takes the contents of the program counter minus a quantity 4 as the new address for the I7 instruction which is the same as the I1 instruction. The instructions I7, I8, I9 and I10 are a repetition of the

TABLE V

| LOOP: | | | | | | |
|---|---|---|---|---|---|---|
| | XMIT | IV-L1, IVL | | I1, | I7, | I13 |
| | MOVE | IV FIELD 4–3, | R1 | I2, | I8, | I14 |
| | XMIT | IV-L0, IVL | | I3, | I9, | I15 |
| | XEC | TAB(R1) | | I4, | I10, | I16 |
| | JMP | LOOP | | I6, | I12, | |
| | | | | | | |
| TAB: | | | | | | |
| | 000 | XMIT 101, | IV FIELD 6–3 | I5 | | |
| | 001 | XMIT 100, | IV FIELD 6–3 | | | |
| | 010 | XMIT 111, | IV FIELD 6–3 | I11 | | |
| | 011 | JMP (OUT) | | I17 | | |

In instruction I1, the 8-bit binary address of the left bank buffer store L1 (buffer store 8-L1 in FIG. 2), is transmitted from the I field of the instruction to the destination location IVL. As previously explained, the IVL location specifies the internal address octal 07 which is the address which gates the I field of the I1 instruction onto the IV bus 2 for the purpose of setting the enable latch in one of the buffer stores 8. The buffer store 8-L1 in FIGS. 2 and 5 detects its own address in the manner previously described in connection with the address detector 48 and the enable latch 68 of FIG. 4. The I1 instruction, therefore, addresses the buffer store 8-L1 which, as shown in FIG. 5, receives control lines from the floppy disc drive 7-1.

The I2 instruction functions to access a particular field from the addressed buffer store 8-L1. The particular field accessed is the 3-bit field starting with BIT 4. Accordingly, BIT 4, BIT 3 and BIT 2 are moved from the buffer store 8-L1 to the R1 register (octal address 01) in the working register 12. The R1 register is specified in the D field of the I2 MOVE instruction. In TABLE V, the 3-bit field for BIT 4, BIT 3 and BIT 2 is assumed to be 000. Referring to FIG. 5, a 000 for those bits indicates that there is write protection (WR PROTECT*), that there is an unsafe condition (UNSAFE*), and that the head is on track 0 (TRK00).

The I3 instruction causes the 8-bit binary address of the left bank L0 buffer store (buffer store 8-L0 in FIGS. 2 and 5) to be addressed for setting its internal enable latch while all other left bank buffer stores have their enable latches disabled.

The instruction I4 causes the instruction address formation circuitry to address a table of instructions at a high-order address specified by an address (TAB) in the XEC instruction. The entry in the table, that is the instructions I1, I2, I3 and I4, respectively. In the I8 instruction, the 3-bit field in buffer store 8-L1, in the assumed example establishes the R1 field as 010. The I10 instruction, therefore, jumps to the third entry of the table for the I11 instruction.

The I11 instruction transmits a 111 field to the BIT 6, BIT 5, BIT 4 field of buffer store 8-L0 thereby energizing the indicated control lines to the floppy disc drive.

The I12 instruction causes the address to return so that the I13 instruction is the same as the I1 and I7 instructions. The I13, I14, I15 and I16 instructions are identical to the I1, I2, I3 and I4 instructions, respectively. In the I14 instruction, the R1 field, in the example assumed, is stored as 011. In the I16 instruction, the address jumps to the table entry 011 for instruction I17.

The I17 instruction causes the program address to jump to a new instruction location (OUT) which designates the end of the program or some other section in the program.

While the invention has been particularly shown and described with reference to preferred embodiments thereof it will be understood by those skilled in the art that various changes in form and details may be made therein without departing from the spirit and the scope of the invention.

What is claimed is:

1. An apparatus for controlling digital devices comprising,
    interface buffer means for storing input signals from a digital device and for storing output signals for a digital device where said input and output signals are operands,
    memory means for storing a program of instructions including instructions for specifying said buffer means as a source of and as the destination of variable-field operands utilized in executing said instructions, interpreter means connected to said memory means to fetch instructions from said memory means and connected to said buffer means to fetch and store operands from and to said buffer means, said interpreter means including means for sequentially fetching instructions from said memory means, means for executing fetched instructions, and means for fetching and storing variable-field operands from and to said buffer means in the execution of instructions whereby said input signals from a digital device are interpreted under program control to produce output signals to control a digital device.

2. The apparatus of claim 1 wherein said buffer means includes, a plurality of addressable buffer stores each having a distinguishing address, a common interpreter bus connecting said buffer stores to said interpreter means, and where each of said buffer stores includes,
  address detection means for detecting when the buffer store is addressed and enable means responsive to said address detection means for enabling the buffer store when addressed and disabling the buffer store when not addressed.

3. The apparatus of claim 2 including,
  working store means for storing variable-field operands accessable by said interpreter means,
  address means connected to said interpreter bus for detecting addresses which specify said working store,
  data connection means connected to said interpreter bus for connecting data into and out from said working store over said interpreter bus when addressed by said address means.

4. The apparatus of claim 1 wherein said interpreter means includes,
  an instruction register for receiving instructions from said memory means,
  control means responsive to said instruction register for decoding instructions in said instruction register to control said interpreter means,
  variable-field length means responsive to said control means for selecting variable-length fields of operands fetched from or stored in said buffer means.

5. The apparatus of claim 4 wherein said means for accessing variable-length fields includes a length mask responsive to said control means for forcing to predetermined states predetermined fields in fetched or stored operands.

6. The apparatus of claim 1 wherein said interpreter means includes,
  timing means for producing clock signals which define an instruction cycle with a read portion and a write portion,
  an instruction register for receiving instructions from said memory means each instruction cycle,
  variable-field means for selecting variable-fields in operands fetched from or stored in said buffer means,
  control means responsive to said instruction register for decoding instructins to control said buffer means and said variable-field means, said control means including means for reading operands from said buffer means during the read portion of said instruction cycle and for writing altered operands in said buffer means during said write portion of said instruction cycles.

7. The apparatus of claim 1 wherein said memory means is a read-only memory.

8. The apparatus of claim 1 wherein said buffer means includes a first plurality of buffer stores connected by a first enable line and includes a second plurality of buffer stores connected by a second enable line and wherein said interpreter means includes means for accessing one of said first plurality of buffer stores to obtain a source operand and to access one of said second plurality of buffer stores to store a destination operand during the execution of one instruction.

9. The apparatus of claim 1 wherein said buffer means includes a plurality of buffer stores wherein each of said buffer stores includes,
  a plurality of latch circuits for storing said input and output signals,
  receiver means connected by a device bus to a digital device or connected by an interpreter bus to said interpreter means for receiving signals for storage in said latch circuits,
  transmitter means connected by a device bus to a digital device or connected by said interpreter bus to said interpreter means for transmitting signals stored in said latch circuits to a device or to said interpreter means,
  receiver enable means for enabling said receiver circuits to receive signals from said device bus or, when conditioned, to receive signals from said interpreter bus for storage in said latch circuits,
  means to condition said receiver enable means to receive signals from said interpreter bus whenever said device bus does not have signals for storage in said latch circuits,
  transmitter enable means for enabling said transmitter means to transfer signals stored in said latch circuits to said device bus and to said interpreter bus.

10. The apparatus of claim 1 wherein said interpreter means includes,
  timing means for producing clock cycles to establish instruction cycles, for timing said interpreter apparatus,
  an instruction register for receiving an instruction from said memory means once each instruction cycle under control of said timing means,
  control means connected to decode instructions in said instruction register including means for responsively accessing said buffer means within one instruction cycle.

11. The apparatus of claim 10 wherein said timing means includes means for generating a first clock signal for latching an instruction in said instruction register once each clock cycle whereby one instruction cycle equals one clock cycle and whereby said buffer means is accessable for reading and writing operands in one clock cycle.

12. The apparatus of claim 1 wherein said buffer means includes a plurality of buffer stores wherein each of said buffer stored includes,
  a plurality of latch circuits for storing said input and output signals,
  device bus connection means for connecting a digital device to said latches,
  interpreter bus connection means for connecting said interpreter means to said latches, device enable means for enabling said device bus connection means to connect information into or out from said latches, interpreter enable means, including an enable latch, for enabling said interpreter bus connection means to connect information into or out from said latches, address detector means connected to said interpreter bus connection means and operative to enable said enable latch in response to a unique address and to disable said enable latch in response to all other addresses.

13. The apparatus of claim 12 including priority circuit means for inhibiting said interpreter enable means whenever said device enable means is enabled for writing information into said latches.

14. The apparatus of claim 12 wherein each of said device bus connection means and said interpreter bus connection means includes tri-state gate means connected to the output of said latches for reading out information from said latches whenever said device enable means or said interpreter enable means is enabled, respectively, for reading out information.

15. The apparatus of claim 1 wherein said buffer means includes a first plurality of buffer stored connected by a first enable line and wherein said interpreter means includes means for accessing one of said first plurality of buffer stores to obtain a source operand and to access one of said first plurality of buffer stores to store a destination operand during the execution of one instruction.

16. An apparatus for controlling one or more digital devices with digital device signals in the form of operands propagated to and from said devices over device buses, said apparatus comprising, memory means for storing a program of instructions where the program determines the device signals to be transmitted to one or more digital devices as a function of device signals from one or more digital devices, said memory means addressed by an instruction address on an address bus to produce an instruction on an instruction bus, interpreter means for instruction and operand accessing and instruction execution including, timing means producing clock signals for defining instruction cycles with a read portion and a write portion, instruction address formation means, responsive to said clock means, inclucing a program counter for forming a new instruction address each instruction cycle and including an address register having inputs connected to said program counter for storing said new instruction address and having outputs connected to said address bus to address said memory means once each instruction cycle, an instruction register connected to sid instruction bus for receiving instructions from said memory means once each instruction cycle, arithmetic and logic means for performing arithmetic and logic functions specified by instructions on operands specified by instructions, interpreter bus means connected to transfer operands to and from said arithmetic and logic means, variable-field means for varying the fields, under instruction control, of operands transmitted to and from said arithmetic and logic means, control means for decoding instructions in said instruction register for controlling said interpreter means to address and fetch instructions, to fetch and store operands, and to execute fetched instructins on fetched operands, a plurality of interface buffer stores for receiving, storing and transmitting device signals as operands where each of said stores includes, a plurality of latch circuits for storing said device signals as operands, receiver means connected to one of said device buses and to said interpreter bus means for receiving device signals for input to said latch circuits, transmitter means connected to said one of said device buses and to said interpreter bus means for transmitting signals stored in said latch circuits, receiver enable means for enabling said receiver means to receive device signals from said one of said device buses or, when conditioned, from said interpreter bus means for storage in said latch circuits, transmitter enable means for enabling said transmitter means to transfer signals stored in said latch circuits to said one of said device buses or to said interpreter bus means, address detection means connected to said interpreter bus means for detecting a unique buffer store address, enable latch means connected to said address detection means for conditioning said receiver means to receive device signals from said interpreter bus means in response to an enable command from said control means when said unique buffer store address is detected.

17. The apparatus of claim 16 wherein said control means includes first enable means connected to a first plurality of said buffer stores for enabling an addressed one of said first plurality of buffer stores and second enable means connected to a second plurality of said buffer stores for enabling an addressed one of said second plurality of buffer stores, means to enable said addressed one of said first plurality of stores to access a source operand during said read portion of one instruction cycle and means to enable said addressed one of said second plurality of buffer stores to store a destination operand during said write portion of said one instruction cycle.

18. The apparatus of claim 17 including, a working store, a first one of a plurality of buffer stores connected to enable and address said working store, a second one of said first plurality of buffer stores connected to transfer data into and out from said working store.

19. The apparatus of claim 16 wherein said variable-field means includes, a shifter for shifting operands in response to said control means, means for forcing predetermined fields of operands to a predetermined state in response to said control means.

20. The apparatus of claim 16 wherein said address formation means includes address latches for storing the address of a current instruction, selection means for selecting inputs for storage in said address latches from said program counter, from said arithmetic and logic unit, and from said instruction register.

21. A controller apparatus comprising, buffer means for storing input and output signals where said input and output signals constitute operands, memory means for storing a plurality of instructions including instructions for specifying said buffer means as a source of and as the destination of variable-field operands utilized in executing said instructions, interpreter means including instruction fetching means connected to said memory means to fetch instructions from said memory means; including operand fetching means, separate from said instruction fetching means, and connected to said buffer means to fetch and store operands from and to said buffer means; including means for executing fetched instructions on variable-field operands fetched from and stored in said buffer means; and including control means for controlling said controller apparatus in response to fetched instructions.

22. The apparatus of claim 21 wherein said interpreter means includes, an instruction register for receiving instructions from said memory means, control means responsive to said instruction register for decoding instructions in said instruction register to control said interpreter, variable-field length means responsive to said control means for selecting variable-length fields of operands fetched from or stored in said buffer means.

23. The apparatus of claim 21 wherein said buffer means includes, a plurality of addressable buffer stores each having a distinguishing address, a common interpreter bus conecting said buffer stores to said interpreter means, and where each of said buffer stores includes, address detection means for detecting when the buffer store is addressed and enable means responsive to said address detection means for enabling the buffer store when addressed and disabling the buffer store when not addressed.

24. The apparatus of claim 23 including, working store means for storing variable-field operands accessable by said interpreter means, address means connected to said interpreter bus for receiving addresses which specify said working store and, connected to address said working store means, data connection means connected to said interpreter bus for connecting data between said working store and said interpreter bus when addressed by said address means.

25. The apparatus of claim 24 wherein said address means includes a first one of said buffer stores for storing low-order addresses of locations in said working store means and includes a second one of said buffer stores for storing a page address as the high-order address of locations in said working store means.

26. An apparatus for controlling digital devices comprising, a plurality of addressable buffer stores each for storing input and output signals where said input and output signals constitute operands, memory means for storing a plurality of instructions including instructions for specifying said buffer stores as the source of and as destination of variable-field operands utilized in executing said instructions, interpreter means including timing means for producing an instruction cycle equal to one clock cycle; including instruction fetching means connected to said memory means to fetch instructions in one instruction cycle; including operand fetching means, separate from said instruction fetching means, and connected to said buffer stores to transfer operands between said interpreter means and said buffer stores during said one instruction cycle; including field control means for selecting variable fields of operands transferred between said interpreter means and said buffer stores; including internal register means for storing operands; including means for executing instructions in said one instruction cycle on variable fields of operands from said buffer stores and said internal register means; and including control means for controlling said apparatus in response to fetched instructions.

27. In an apparatus having memory means for storing instructions, a plurality of instruction addressable buffer stores for storing operands, an interpreter including timing means for defining instruction cycles, including instruction fetching means connected to fetch instructions from said memory means, including operand fetching means separate from said instruction fetching means connected to transfer operands between said buffer stores and said interpreter means, including internal registers for storing operands, including means for executing fetched instructions on operands transferred between said buffer stores and said interpreter means, and including control means for decoding fetched instructions to control said apparatus, the method comprising, fetching an instruction from said memory means to said interpreter means in one instruction cycle, decoding said instruction in said one instruction cycle, accessing one or more operands from said buffer stores and said internal registers in said one instruction cycle, executing said instruction on accessed operands in said one instruction cycle to form a result operand, storing said result operand in said one instruction cycle.

* * * * *

UNITED STATES PATENT AND TRADEMARK OFFICE
CERTIFICATE OF CORRECTION

PATENT NO. : 3,931,615
DATED : January 6, 1976
INVENTOR(S) : Glenn A. Oliver, Kenneth D. Krossa and Douglas B. Earl It is certified that error appears in the above-identified patent and that said Letters Patent are hereby corrected as shown below:

IN THE CLAIMS:

Claim 6, line 12, delete "instructins" and insert therefor -- instructions --.

Claim 8, line 8, delete "second" and insert therefor -- first --.

Claim 15, line 2, delete "stored" and insert therefor -- stores --.

Claim 16, line 26, delete "sid" and insert therefor -- said --.

Claim 16, line 42, delete "instructins" and insert therefor -- instructions --.

Claim 23, line 4, delete "conecting" and insert therefor -- connecting --.

Signed and Sealed this twenty-seventh Day of April 1976

[SEAL]

Attest:

RUTH C. MASON
Attesting Officer

C. MARSHALL DANN
Commissioner of Patents and Trademarks